Aug. 21, 1923.
H. H. MONTAGUE
MOWING MACHINE AND CUTTER THEREFOR
Filed March 9, 1921
1,465,279
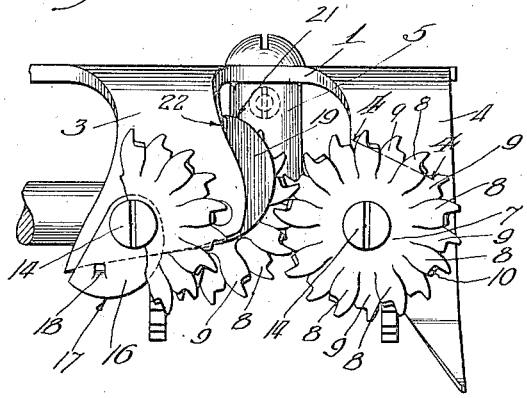
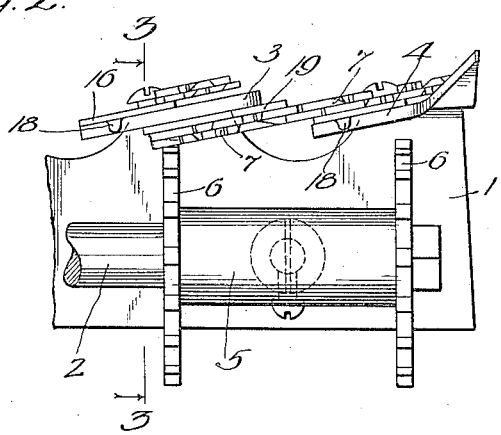
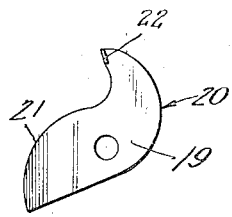
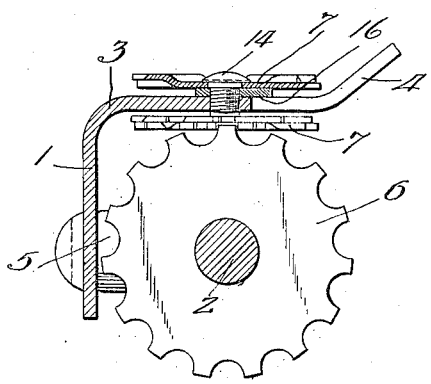
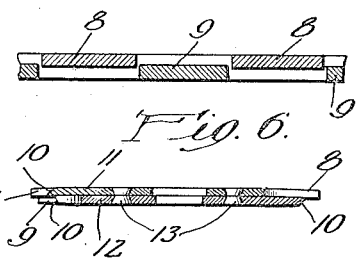
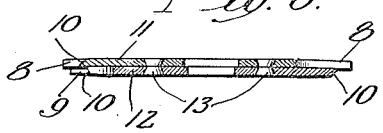
Inventor
H. H. Montague
by Chamberlin & Frederich
Attys.

Patented Aug. 21, 1923.

1,465,279

UNITED STATES PATENT OFFICE.

HUBERT HOWARD MONTAGUE, OF TRAVERSE CITY, MICHIGAN.

MOWING MACHINE AND CUTTER THEREFOR.

Application filed March 9, 1921. Serial No. 450,922.

*To all whom it may concern:*

Be it known that I, HUBERT H. MONTAGUE, a citizen of the United States, residing at Traverse City, county of Grand Traverse, State of Michigan, have invented a certain new and useful Improvement in Mowing Machines and Cutters Therefor, and declare the following to be a full, clear, and exact description of the same, such as will enable others skilled in the art to which it pertains to make and use the same, reference being had to the accompanying drawings, which form a part of this specification.

In my prior Patent No. 1,317,212 dated September 30, 1919 I have disclosed a novel form of mowing machine made up of a plurality of similar individual units each comprising a pair of co-operating rotary discs. The object of the present invention is to simplify and improve the structural details of the machine of the aforesaid patent and of the individual cutting units.

The various features of novelty whereby my invention is characterized will hereinafter be pointed out with particularity in the claims; but for a full understanding of my invention and of its objects and advantages, reference may be had to the following detailed description taken in connection with the accompanying drawings, wherein:

Figure 1 is a top plan view of a fragment of one end of a mowing machine arranged in accordance with a preferred form of my invention;

Fig. 2 is a front elevation of that portion of the machine illustrated in Fig. 1;

Fig. 3 is a section taken approximately on line 3—3 of Fig. 2;

Fig. 4 is a section on an enlarged scale taken through one of the cutting discs approximately on line 4—4 of Fig. 1;

Fig. 5 is a plan view of one of the ejectors or cleaning devices lying between one of the cutters and the overlying supporting frame; and Fig. 6 is a central axial section through a modified form of cutting disc.

Referring to the drawing, 1 represents a frame of any desired form supporting a horizontal shaft, 2. In the arrangement shown, the frame consists of an approximately vertical plate having at the upper edge forwardly-projecting ears, 3 and 4, the ears being alike, if desired, although the endmost ears, 4, may be shaped to serve also as collecting prongs to deflect the grass or the like inwardly. The shaft is supported from the frame by means of bearings projecting forwardly from the upright portion of the frame, one of such bearings being shown at 5. Fixed to the shaft, below each of the ears, is a toothed wheel, 6, adapted to rest on the ground and serve as the supporting wheels for the mower, as in my aforesaid patent. Viewed from the front of the machine, the ears are inclined so that the plane of the top of one ear cuts through the upper portion of the wheel underneath the next ear in the series. Lying on top of each ear is one of the toothed cutting discs, 7, and lying on the under side of each ear, except one of the endmost ears, is another one of these discs; the parts being so proportioned and arranged that the teeth on each disc below one of the ears mesh with the teeth on top of one of the adjacent ears. The discs on the under sides of the ears are so disposed that the teeth thereon will mesh with the teeth of the adjacent supporting wheels of the machine. Consequently one of the discs of each unit, made up of a pair of co-operating discs, is positively driven from one of the supporting wheels for the machine and positively drives the other disc in the manner that one gear wheel drives another. The teeth on the discs may be so proportioned that the co-operating teeth have a rolling contact with each other, thus making the machine noiseless in operation.

One of the novel features of my improved cutting discs is that they are all precisely alike and interchangeable, each having two sets of teeth lying in two separate planes, the teeth of one set being positioned in the spaces between the teeth of the other set. Thus in the drawings the teeth of one set are indicated at 8 while the teeth of the other set are indicated at 9. The teeth on the discs serve two purposes, the first being that of driving members and the other being that of collecting fingers to draw the blades or stalks into position to be sheared. Shearing edges must be provided, these being preferably disposed so as to extend circumferentially so that as the grass is gathered in by two teeth on two co-operating discs it will enter between two opposed shearing edges which close on the grass and cut it off. The desired characteristics of the teeth as well as the proper shearing edges may conveniently be obtained by first giving the teeth the shape of true gear teeth and then cutting away a portion of the outer end of each tooth, preferably that part lying on one side of a radius bisecting the tooth, the outer end of the mutilated portion of each tooth extending approximately in the circumferential direction and being then beveled, as indicated at 10, to form a shearing edge. The mutilations are made on the right side of the teeth of one set and on the left side of the teeth of the other set so that whenever two of the discs are brought into mesh, the shearing edges on the upper set of teeth of each disc co-operate with the shearing edges on the lower set of teeth in the other disc. The depth to which the excisions in the teeth are made must of course be such that the co-operating cutting edges may travel entirely past each other radially of the discs in the manner of true shears. In order to secure a perfect shearing operation it is necessary that the faces of the members carrying the shearing edges be pressed against each other. This may conveniently be accomplished by bending the teeth of each set slightly toward the plane of the teeth of the other set. In other words, instead of having the adjacent flat faces of the two sets of teeth in substantially the same plane, I prefer to deflect or bend the teeth so that, as shown in Fig. 4, the teeth of each set will extend inwardly somewhat past the plane of the inner faces of the teeth of the other set. With this arrangement, as two of the discs revolve in operative relation to each other, the teeth will be forced to adjust themselves so as to bring the plane of the inner faces of one set into substantially the plane of the inner faces of the other set. This spreading or adjustment of the teeth in the axial direction will take place and remain effective only during the time any particular teeth are meshed with co-operating teeth and, as soon as a tooth passes out of contact with a co-operating tooth of another disc, it springs back to its normal position. In this way each pair of shearing edges as they pass into operative relation to each other are pressed against each other so as to insure a true shearing action. Furthermore, as wear takes place on the flat faces of the teeth, the spring action of the teeth compensates therefor.

The discs may conveniently be stamped out of sheet steel, each disc being made out of a single piece or, as shown in Fig. 6, each disc may be made out of two thin sheets, 11 and 12, the teeth, 8, of one set being on the member 11 and the teeth, 9, of the other set on the member 12; the members 11 and 12 being laid upon each other and fastened together by means of rivets, 13, or otherwise. The displacement of the teeth in the axial direction to secure an effective shearing action may conveniently be accomplished by making the members 11 and 12 more or less dish-shaped and uniting them with their concave sides facing each other. The rivets will flatten out the central portions of the dish members but will permit the teeth to remain deflected.

It is not desirable to depend for a perfect shearing action on a finely fitted journal bearing for the discs or wheels and I therefore proportion the parts so that at least three teeth on each disc will be in engagement with the other disc, two of the teeth being of one set and the other tooth of the second set. While it may be possible to secure this result with a different number of teeth, I have found nine teeth in each set to be a satisfactory number. Two such discs may be brought into interlocking relation to each other and will be found to grip each other firmly enough to permit one disc to be suspended vertically from the other without becoming disengaged therefrom. The discs are revolubly supported by simple screws, 14, passing through the same into the ear members of the frame. In order to prevent dirt or other foreign matter from collecting between the discs and the adjacent surfaces of the supporting ears, I have placed between each disc and the corresponding ear a peculiarly shaped washer. Between each ear and the cutting disc lying above it I place a washer, 16, one edge of which takes the form of a spiral, 17, extending from near the center of the disc to the vicinity of the cutting edge. The washer may be prevented from turning by means of a lip, 18, struck downwardly therefrom and bearing against an edge of the supporting ear. Any foreign matter collecting on the under side of the disc will strike against the spiral edge, 17, of the latter and be pushed outwardly thereby until it drops to the ground. Between each ear and the underlying disc I place a washer, 19, having a spiral edge, 20, similar to the edge 17 and a diametrically opposite spiral edge, 21. The edge 21 serves to clear foreign matter out of the space between the ear and the disc while the edge 20 serves to catch any foreign material lying upon the exposed outer portion of the disc and push it outwardly and cause it to drop down over the edge of the disc before it can enter beneath the ear. Each washer 19 is also provided with a lip 22 struck up therefrom and adapted to engage an edge of the corresponding supporting ear to prevent the washer from turning.

It will thus be seen that I have greatly simplified the details of construction of the machine disclosed in my prior patent, without departing from the principle of operation embodied in that machine. Since the cutting discs are all alike and interchangeable and of simple construction, an entirely new set of cutters may be inserted when one set becomes dull, at a comparatively small expense and without requiring the services of a skilled mechanic for that purpose. It will also be seen, however, that the life of the cutters will be unusually great because of the provision for taking up wear between the shearing elements; this feature at the same time serving to insure a perfect shearing action.

It will of course be understood that my machine may be used for any purpose that mowing machines of various kinds have or may be used for and that it may be made to cut a swath of any desired length by simply making the driving and supporting shaft of the requisite length and adding the necessary number of cutting units.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A combined gear and cutter comprising a wheel-like element having at its periphery two sets of gear teeth displaced from each other in the axial direction, the teeth of one set lying opposite the spaces between the teeth of the other set, each tooth having a portion cut away on one side at the outer end to form a cutting edge extending transverse to a radius traversing that tooth.

2. A combined gear and cutter comprising a wheel-like element having two sets of teeth lying in planes displaced from each other in the axial direction and placed in staggered relation to each other, the teeth being shaped to make rolling contact with the corresponding teeth of a complementary wheel, and each tooth having a portion cut away on one side at the outer end to form a cutting edge extending transverse to a radius traversing that tooth, the excisions in the teeth of both sets being on the same side of the teeth as viewed in one axial direction.

3. A combined gear and cutter comprising a wheel-like element having two sets of gear teeth displaced from each other in the axial direction, the teeth of one set lying opposite the spaces between the teeth of the other set, each tooth having approximately one-half thereof lying on one side of a radius traversing the same cut away at the outer end so as to form a cutting edge transverse to such radius.

4. A combined gear and cutter comprising a wheel-like element having at its periphery two sets of gear teeth displaced from each other in the axial direction, the teeth of one set lying opposite the spaces between the teeth of the other set, each tooth having a portion cut away on one side at the outer end to form a cutting edge extending transverse to a radius traversing that tooth, the teeth of each set being bent slightly out of a plane at right angles to the axis so as to project slightly into the spaces between the teeth of the other set.

5. A combined gear and cutter comprising a wheel-like element having two sets of gear teeth resilient in the direction of the wheel axis and lying in planes displaced from each other in the direction of said axis less than the thickness of a tooth, the outer end of each tooth being cut away on one side to form a cutting edge transverse to a radius traversing that tooth.

6. In a mowing machine, a cutting unit comprising two wheel-like elements each having two sets of gear teeth displaced from each other in the direction of the wheel axis, the teeth of one set lying opposite the spaces between the teeth in the other set, and each tooth having a portion cut away therefrom at one side at the outer end to form a cutting edge transverse to a radius traversing said tooth, each set of teeth on each of said elements meshing with one of the sets of teeth on the other element.

7. In a machine of the character described, a support, a toothed wheel lying in proximity to said support and mounted thereon so as to be rotatable, and a stationary deflector between said wheel and said support having an edge beginning near the axis of rotation of the wheel and curving gradually away from said axis in the form of a spiral to a point near the periphery of the wheel.

8. In a mowing machine, a shaft, a series of toothed wheels fixed to the shaft and adapted to run upon the ground, a frame supported on the shaft, and a series of cutting units supported on the frame in the vicinity of said wheels, there being as many wheels as there are cutting units, each cutting unit comprising two wheels each having two sets of gear teeth lying in planes displaced from each other in the axial direction and mutilated so that each has at one side a cutting edge extending transverse to a radius traversing that tooth, the teeth of one set lying opposite the spaces of the teeth in the other set, the teeth of one of said cutting wheels meshing with the corresponding toothed supporting wheel for the machine and both sets of teeth of the latter cutting wheel meshing with the teeth of the other cutting wheel of that unit.

In testimony whereof, I sign this specification.

HUBERT HOWARD MONTAGUE.